United States Patent [19]
Everts

[11] Patent Number: 5,076,149
[45] Date of Patent: Dec. 31, 1991

[54] WRIST PIN, PISTON ASSEMBLY AND METHOD FOR MAKING SAME

[75] Inventor: Robert G. Everts, Chandler, Ariz.

[73] Assignee: Inertia Dynamics Corporation, Chandler, Ariz.

[21] Appl. No.: 624,048

[22] Filed: Dec. 7, 1990

[51] Int. Cl.⁵ .............................................. F16J 1/04
[52] U.S. Cl. .................................. 92/208; 29/888.05;
403/153; 123/193 P; 74/579 E; 411/501;
92/261
[58] Field of Search ................. 92/172, 187, 208, 261;
29/888.05, 888.01, 522.1, 523, 524.1; 123/193
P; 411/500, 501; 403/150, 151, 152, 153, 154;
74/44, 579 E

[56] References Cited

U.S. PATENT DOCUMENTS

| 1,222,802 | 4/1917 | Royce | 403/154 |
|---|---|---|---|
| 1,288,786 | 12/1918 | Wilschewski | 403/150 |
| 2,664,327 | 12/1953 | Elliott | 403/154 |
| 2,770,511 | 11/1956 | Powell | 403/150 |
| 2,806,752 | 9/1957 | Ginn | 29/888.05 |

FOREIGN PATENT DOCUMENTS

| 69821 | 12/1914 | Switzerland | 403/153 |
|---|---|---|---|
| 71959 | 5/1915 | Switzerland | 403/153 |
| 171504 | 11/1921 | United Kingdom | 403/153 |

Primary Examiner—Edward K. Look
Assistant Examiner—Thomas Denion
Attorney, Agent, or Firm—Brooks & Kushman

[57] ABSTRACT

A piston assembly is disclosed having a wrist pin for pivotably attaching a connecting rod to a piston for use in an internal combustion engine. The wrist pin is formed from an elongated circular cylindrical body having a pair of deformable sections formed adjacent each end and a relatively hard middle section therebetween. The wrist pin is sized for insertion along a longitudinal axis defined by a pair of coaxially aligned, spaced apart bores formed in diametrically opposed portions of the piston. The deformable end sections are adapted to be deformed sufficiently to engage the bores of the piston to limit the axial movement therebetween. The relatively hard middle section spans between the bores in the piston for pivotably engaging one end of the connection rod.

17 Claims, 2 Drawing Sheets

WRIST PIN, PISTON ASSEMBLY AND METHOD FOR MAKING SAME

TECHNICAL FIELD

This invention relates to piston assemblies, and more particularly to piston assemblies for use in small single and dual piston internal combustion engines.

BACKGROUND ART

A great many reciprocating piston engines and pumps are known in the prior art which utilize a piston pivotably connected to a connecting rod by a wrist pin. High speed internal combustion engines frequently utilize a aluminum piston to minimize weight and bearing load and a steel wrist pin to achieve the necessary strength characteristics. It becomes very important to securely locate the wrist pin relative to the piston so that it is not longitudinally displaced sufficiently to scrape the cylinder wall resulting in scoring and premature engine failure.

A number of methods have been utilized to securely orient the wrist pin to the piston. One such method is to provide an interference fit between the wrist pin and the corresponding bores formed in the piston. While this technique has achieved wide-spread use, a number of problems exist, namely, if the engine is overheated, the piston pin may become loose as a result of differences between the rate of thermal expansion between the aluminum piston and the steel wrist pin. In order to achieve sufficient interference and in order to minimize the likelihood of the relative movement, large interferences resulting in large press loads occur. Press-fitting of the wrist pin into the piston may result in deformation of the piston causing the piston ovalarity or an out-of-round condition which can, if excessive, result in a localized high wear spot on the piston skirt. In order to minimize pin press loads, attempts have been made to heat the piston and/or chill the wrist pin prior to assembly. However, this is time-consuming and a costly process.

Another prior art method of implanting a wrist pin relative to the piston is to press the wrist pin into the connecting rod while allowing the wrist pin to freely rotate relative to the piston. While this method minimizes the thermal expansion problems since the wrist pin and connecting rod will typically be formed of materials having similar thermal expansion rates, deformation of the piston frequently occurs during assembly and production tolerances for a wrist pin and connecting rod corresponding diameters become highly critical.

An alternative method for retaining the wrist pin in a piston is to utilize snap rings located in recesses formed in the piston to limit the axial movement of the wrist pin. This type of design is frequently referred to as a full-floating piston since the wrist pin is free to rotate relative to the piston as well as the connecting rod. This piston attachment technique results in a very concentric piston. However, snap rings periodically become disengaged during operation as a result of improper installation resulting in serious damage if not a complete failure of the engine. The use of snap rings is also costly in that not only do snap rings need to be purchased and carefully installed, but snap ring grooves need to be machined in the piston requiring yet another machining operation.

Yet another method of securing the wrist pin to the piston which is frequently used in small engines is to stake the piston and/or end of the wrist pin so as to cause sufficient deformation to prevent relative longitudinal movement. Staking, while very economical, is not without problems. If a stake is placed with an adequate force, there is the risk that the wrist pin may become dislodged subsequently during engine operation. If the stake is achieved with too great a force, the piston may become out-of-round resulting in excessive piston wear and potentially premature failure.

SUMMARY OF THE INVENTION

An object of the present invention is to provide a simple low cost wrist pin which can be securely and reliably positioned relative to the piston.

Another object of the present invention is to minimize piston deformation resulting from piston connecting rod wrist pin assembly.

Yet another object of the present invention is to provide a piston wrist pin connecting rod assembly which can be visually inspected to verify a proper assembly.

Accordingly, the wrist pin of the present invention is provided for securing a connecting rod to a piston for use in an internal combustion engine. The wrist pin is made up of an elongated circular cylindrical body having a pair of ends and a pair of deformable sections extending inwardly therefrom from each end. Oriented between the two deformable sections is a relatively hard middle section. The wrist pin body is sized to be insertable along a longitudinal axis defined by a pair of coaxially aligned spaced apart bores formed in diametrically opposed portions of the piston. The middle section of the body extends along the longitudinal axis a distance sufficient to support the connecting rod for pivotable movement relative to the piston. The deformable end sections of the wrist pin are adapted to be deformed sufficiently to engage the bores formed in the piston to limit the axial movement thereof along the longitudinal axis.

Additionally, a method of forming a wrist pin is provided which includes the step of forming an elongated circular cylindrical body of a hard relatively non-deformable metal having a diameter selected to cooperate with a pair of spaced apart bores formed in a piston at one end of a connecting rod. A pair of sections on the elongated body adjacent each end and extending inwardly therefrom is selectably annealed to form deformable sections which are relatively softer than the hard middle section. Preferably, the middle section has a length greater than the distance between the spaced apart bores formed in the piston so that the non-deformable middle section cooperates with both bore portions and completely spans therebetween.

The advantages of the present invention will be apparent from the drawings, the following description, and the appended claims.

BRIEF DESCRIPTION OF THE DRAWINGS

FIG. 8 is a end view of the wrist pin of FIG. 7 taken along the line 8—8.

BEST MODES FOR CARRYING OUT THE INVENTION

Figure 1:
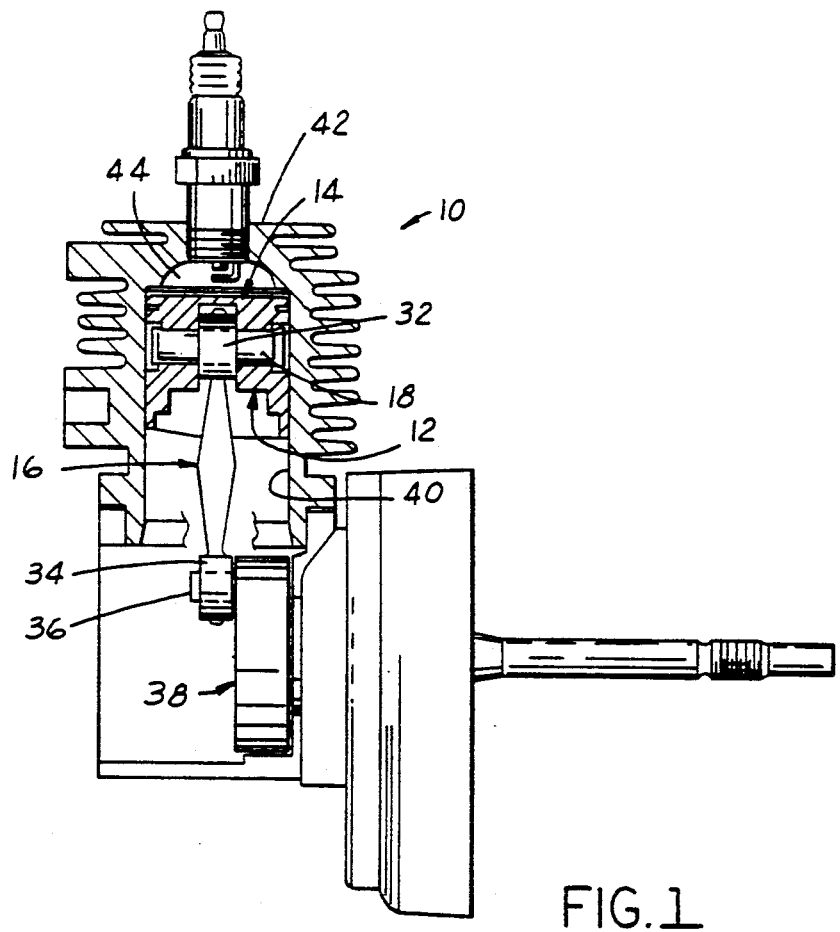
FIG. 1 is a cross-sectional view of a small engine showing the installation of a first embodiment of the wrist pin/piston/connecting rod invention.

FIG. 1 illustrates a cross-sectional side elevation of a small displacement engine 10 equipped with a piston assembly 12 of the present invention. Piston assembly 12 which is shown in more detail in FIG. 2 includes a piston 14, a connecting rod 16 and a wrist pin 18 which pivotably connects the connecting rod to the piston. The piston 14 is generally cylindrical having a flat head 20 and a cylindrical skirt 22. Longitudinal axis 24 is oriented perpendicular to cylindrical skirt 22 and is coaxially aligned with wrist pin 18. Also oriented along the longitudinal axis are a pair of coaxially aligned spaced apart bores 26 and 28 formed in diametrically opposed portions of piston 14. Wrist pin 18 has a diameter size to cooperate with bores 26 and 28 formed in piston 14.

In the preferred embodiment illustrated, a slight clearance is provided between the wrist pin 18 and bores 26 and 28 so that a slip fit can be achieved. However, it should be appreciated that a light press or interference fit could be utilized as well. Wrist pin 18 is also sized to cooperate with bearing 30 formed in the first end 32 of connecting rod 16. As illustrated in FIG. 1, connecting rod 16 is provided with a first end 32 which pivotably connects to wrist pin 18 and a second end 34 is pivotably connected to crank pin 36.

The preferred structure of connecting rod 16 and crank shaft 38 are described in detail in U.S. Pat. Nos. 4,369,742 and 4,356,605 issued to the applicant which are incorporated by reference herein in their entirety. Engine 10 operates in a typical slider crank manner. Piston 14 reciprocates within cylinder wall 40 defined by cylinder housing 42. As crank shaft 38 rotates, the crank pin 36 and connecting rod 16 will cause piston 14 to reciprocate resulting in the volume of chamber 44 which is bounded by cylinder wall 40 and piston 14 to vary in a conventional manner. Piston 14 has a cylindrical skirt 22 with a diameter sized to slip-fit within that of cylinder wall 40. One or more rings of conventional design (not shown) are provided for facilitating a pressure-tight seal between piston 14 and cylinder wall 40.

Figure 2:
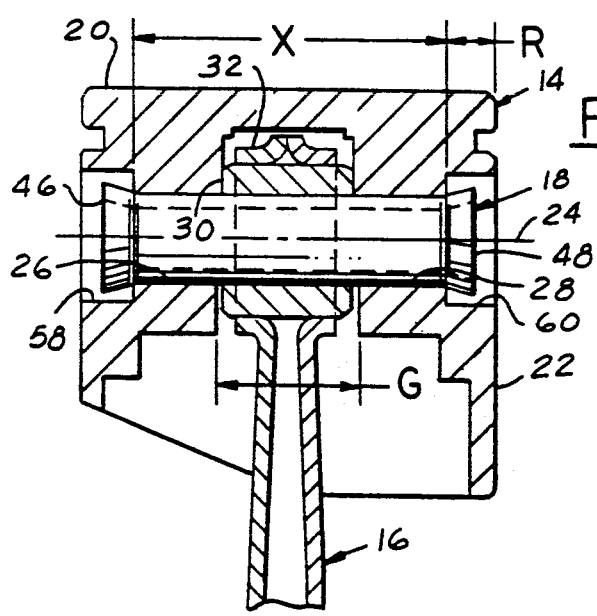
FIG. 2 is an enlarged partial cross-sectional view of the piston assembly of FIG. 1.
Figure 3:
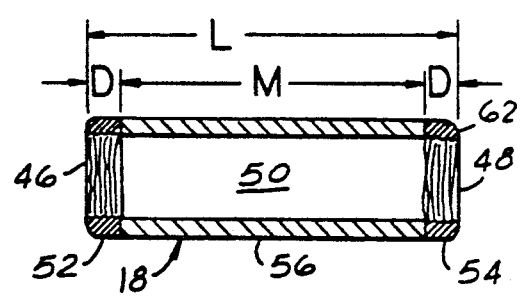
FIG. 3 is an enlarged cross-sectional view of the wrist pin of FIG. 2 prior to installation.

Wrist pin 18 is illustrated in the installed state in FIG. 2 is shown prior to installation in FIG. 3. When installed ends 46 and 48 of wrist pin 18 are outwardly deformed in a bell-mouth manner so as to limit the axial movement of the wrist pin relative to bores 26 and 28 formed in piston 14. Prior to installation, wrist pin 18 is an elongated circular cylindrical body having a generally uniform of outer cylindrical diameter. In the preferred embodiment illustrated, the wrist pin is formed of a hardened tubular steel rod having a precision ground outside diameter. Bore 50 extends centrally through the wrist pin. Wrist pin 18 is provided with a pair of deformable end sections 52 and 54 which each extend inwardly a distance D from each end 46 and 48 of the wrist pin respectively. Oriented between deformable sections 52 and 54 is a relatively hard middle section 56 having a length M. The middle section is a sufficient length to support the connecting rod for pivotable movement relative to the piston. Preferably, the middle section has a length M long enough to span between the gap G formed between the spaced apart bores 26 and 28 in the piston so that middle section 56 cooperates with at least a portion of each of the bores 26 and 28.

In the preferred embodiment illustrated, the wrist pin is formed from hardened steel tubular rod formed of steel grade SAE1018 or 1022 or equivalent having a Rockwell hardness in the 59–64 range. Deformable ends 52 and 54 are fully annealed using an induction heating process to achieve a Rockwell hardness in the range 30 to 90. Ends 52 and 54, once annealed, can be easily staked to securely retain wrist pin 18 within bores 26 and 28 in piston 14. Piston 14 is preferably provided with a pair of recesses 58 and 60 aligned with longitudinal axis 24 on diametrically opposites sides of the piston. Recesses 58 and 60 are slightly larger than bore 26 and 28 to provide a region at which the ends of wrist pin 18 may be radially outwardly expanded. Recesses 58 and 60 have a longitudinal depth R as illustrated in FIG. 2. The longitudinally outward extreme edges of bores 26 and 28 are spaced from one another a distance X which is equal to the piston diameter less twice the recess depth R. This overall bore length X is preferably less than wrist pin length L so that when centered, a portion of deformable sections 52 and 54 will extend outward and beyond bore 26 and 28, respectively. By fabricating wrist pin 18 having a length L which is greater than the overall bore length X, the wrist pin 18 may be securely staked in place with little if any deformation of the piston.

It should also be appreciated that the length M of the relatively hard middle section of the wrist pin is ideally less than distance X so that only relatively soft deformable sections 52 and 54 would outwardly overhang the bores 26 and 28 and extend into recesses 58 and 60. It is therefore easy to inspect the piston assembly to determine that sufficient staking has occurred to securely retain the wrist pin.

It should be appreciated that the relatively hard middle section 56 provides a strong lightweight connection between the connecting rod 16 and the piston while the deformable ends 52 and 54 primarily serve solely to limit relative longitudinal movement therebetween. By forming the wrist pin from a hardened tubular steel rod having a precisely controlled outer diameter, no additional machining is necessary to provide a surface sufficient for bearing 30 in first end of the connecting rod 32 to ride upon. This is even true in the case when bearing 30 is a cylindrical roller bearing typically used in small, high speed, two cycle engines.

To form a wrist pin of the preferred structure illustrated in FIG. 3, first a hardened tubular steel rod having the selected outer diameter is cut to a proper length L. The ends of the rod are annealed using a conventional induction heating elements so that the region of the rod adjacent each of its ends is annealed a selected distance D leaving a relatively harder middle region M therebetween. Any sharp corners or burrs on the ends of the wrist pin are removed by forming a chamfer 62 in a conventional manner which also serves to facilitate easy installation of the wrist pin. Ideally, a rust-inhibiting oil or other coating will be applied particularly if there will be some long period of time between wrist pin fabrication and installation in an engine.

Figure 4:
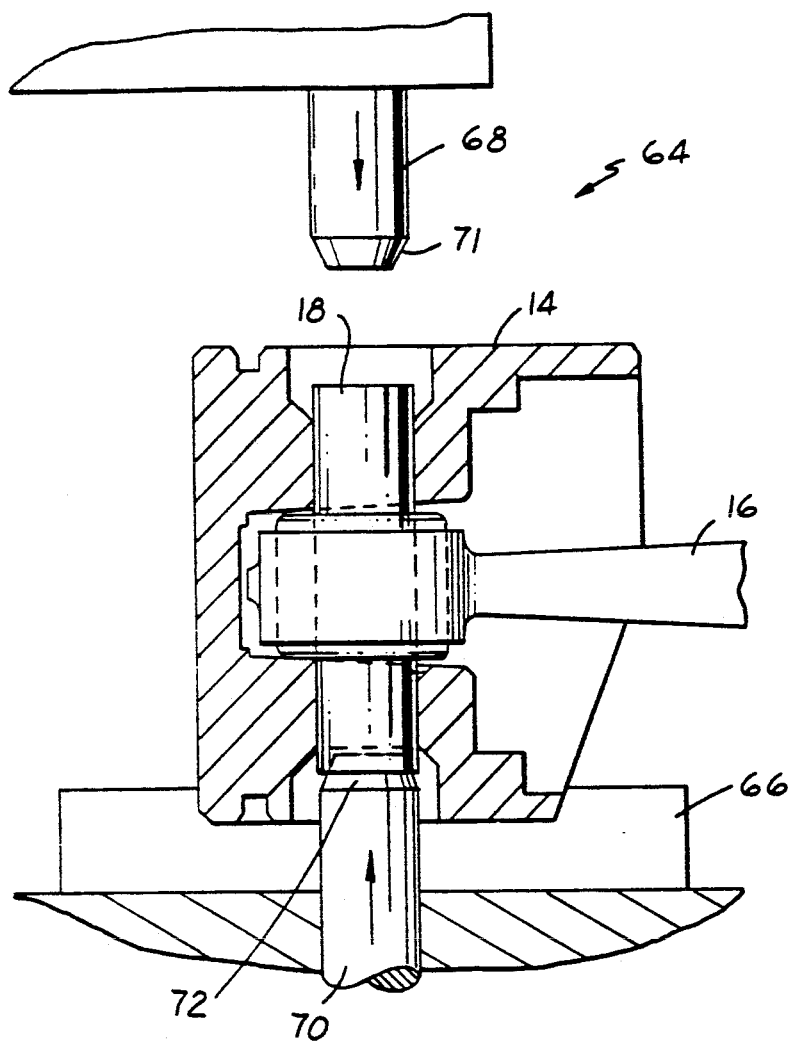
FIG. 4 is a cross-sectional view illustrating the assembly of a piston wrist pin and connecting rod.

A fixture 64 for fabricating a piston connecting wrist pin assembly is illustrated in FIG. 4. Piston 14 is supported upon V-block 66 with the longitudinal axis of the piston 14 oriented generally vertically. The first end 32 of connecting rod 16 is positioned in the gap between two spaced apart bores 26 and 28 then bearing 30 is coaxially aligned with longitudinal axis 24. Upper and lower arbors 68 and 70 are aligned with longitudinal axis 24 and each are provided with a frustoconical end portion 71 and 72 sized to fit within hollow bore 50 of wrist pin 18. As arbors 68 and 70 are moved toward one another, the opposite ends of wrist pin 18 are outwardly radially deformed in a conical bell-mouth shape.

Figure 6:
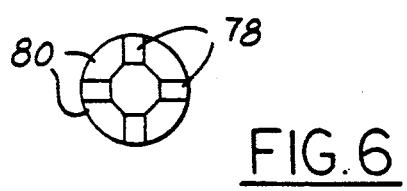
FIG. 6 is an end view of the anvil of FIG. 5.
Figure 5:
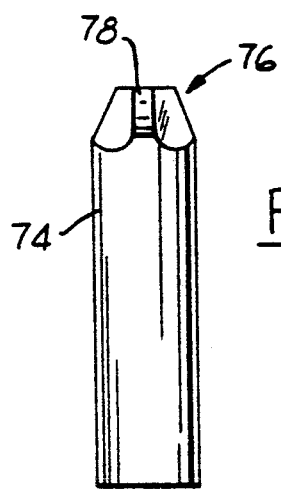
FIG. 5 is a side elevational view of an alternative anvil.
Figure 7:
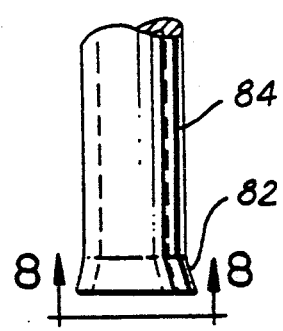
FIG. 7 is an enlarged partial view of a wrist pin deformed utilizing the anvil of FIG. 5.
Figure 7:
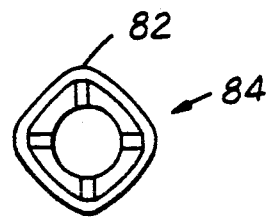

An alternative design is illustrated in FIGS. 5 and 6. Arbor 74 is provided with an end 76 which is made up of a series of frustoconical segments 78 alternatively spaced by inclined flats 80. In the embodiment illustrated, four frustoconical segments 78 will outwardly form of four lobes 82 in wrist pin 84 as illustrated in FIGS. 7 and 8. By outwardly radially deforming a series of lobes as opposed to a uniform frustoconical bell-mouth section, the press load required on the arbor can be minimized since the resulting hoop deformation in the tubular wrist pin 84 is greatly minimized.

Of course, it should be appreciated that many alternative arbor designs could be utilized as well as a conventional staking tool for the purpose of deforming the respective ends of the wrist pin made in accordance with the present invention. While the preferred embodiment the wrist pin illustrated in the drawings is tubular, one should also appreciate that solid wrist pins can be fabricated in accordance with the present invention. In the instances where a solid wrist pin is used, rather than using an arbor a punch shaped tool member having one or more localized points to engage the end of the wrist pin can be utilized to stake the wrist pin in place. It should also be appreciated that it is possible to stake the piston immediately adjacent the wrist pin as is frequently conventionally done using a wrist pin of the present invention and the relatively soft deformable ends of the wrist pin will facilitate more secure staking even when the wrist pin is inwardly radially deformed as opposed to being outwardly deformed as described previously.

While the best mode for carrying out the invention has been described in detail, those familiar with the art to which this invention relates will recognize various alternative designs and embodiments for practicing the invention as defined by the following claims.

What is claimed is:

1. A wrist pin for securing a connecting rod to a piston, said wrist pin comprising:
    an elongated circular cylindrical body having a pair of ends, a pair of deformable sections each extending inwardly from each end, and a relatively hard middle section oriented between said deformable sections;
    wherein said body is sized to be insertable along a longitudinal axis defined by a pair of coaxially aligned spaced apart bores formed in diametrically opposed portions of a piston skirt so that the body middle section extends along the longitudinal axis a distance sufficient to support a connecting rod for pivotable movement relative to the piston, said deformable sections are plastically deformed sufficiently to engage the bores in the piston skirt to limit axial movement therebetween.

2. The wrist pin of claim 1 wherein said body is tubular.

3. The wrist pin of claim 1 wherein said body is formed of a hardenable metal alloy and said deformable sections are annealed.

4. The wrist pin of claim 3 wherein said body is formed of steel.

5. The wrist pin of claim 4 wherein said deformable sections have a Rockwell hardness ranging from about 30 to about 39 and said middle section has a Rockwell hardness ranging from about 59 to about 64.

6. The wrist pin of claim 1 wherein said body is formed of a hardened tubular rod having a ground exterior surface and said deformable sections are formed by annealing a portion of the body adjacent each end.

7. The wrist pin of claim 1 wherein the body middle section is longer than the distance between the spaced apart bores formed in the piston so that a middle section of the body cooperates with a portion of each of said bores.

8. A piston assembly comprising:
    a piston having formed therein a pair of coaxially aligned spaced apart bores formed therein which are oriented along a longitudinal axis and formed in portions of a piston which are diametrically opposed from one another;
    a wrist pin formed of an elongated circular cylindrical body having a pair of ends, a pair of deformable sections each extending inwardly from each end and a relatively hard middle section oriented between said deformable sections; and
    an elongated connecting rod having a first end adapted to pivotably cooperate with the wrist pin and a second end spaced therefrom adapted to pivotably cooperate with a crank shaft;
    wherein said wrist pin body is sized to cooperate with the connecting rod first end and to be insertable within the spaced apart bores formed in the piston where the deformable sections of the wrist pin are plastically deformed sufficiently to engage the bores of the piston limiting the relative axial movement therebetween 9. The piston assembly of claim 8 wherein said piston has a cylindrical skirt oriented perpendicular to said longitudinal axis with a pair of recesses formed therein at the intersection of the longitudinal axis and a diametrically opposed portions of the skirt to cause the outwardmost portion of each of the bores to be recessed relative to a cylinder defined by the piston skirt and wherein said wrist pin has a length less than the diameter of the piston yet sufficiently long to protrude outwardly beyond each of said spaced apart bores into each of said recesses.

10. The piston assembly of claim 9 wherein said wrist pin is tubular and the end portions thereof protruding into the recesses are outwardly deformed in a circular bell-mouth shape exceeding the size of the spaced apart bores.

11. The piston assembly of claim 9 wherein the ends of the wrist pin are outwardly deformed to create a plurality of lobes which extend beyond the diameter of the spaced apart bores in the piston.

12. The piston assembly of claim 8 wherein the wrist pin body middle section is longer than the distance between the spaced apart bores formed in the piston so that the middle section of the wrist pin body cooperates with a portion of each of said spaced apart bores.

13. The piston assembly of claim 8 wherein the wrist pin body is formed of a hard tubular steel rod having a ground exterior surface.

14. A method of forming a piston/connecting rod assembly comprising the steps of:

providing a piston having a generally cylindrical surface and a pair of coaxially aligned spaced apart bores aligned along a longitudinal axis deformed in diametrically opposed portions of a piston;

providing a wrist pin formed of an elongated circular cylindrical body having a diameter sized to cooperate with the spaced apart bores of the piston;

providing a connecting rod having a first end sized to pivotably cooperate with a wrist pin and a second end adapted to pivotably cooperate with an engine crankshaft;

aligning the first end of the connecting rod between the spaced apart bores formed in the piston;

inserting the wrist pin into the bores in the piston and the connecting rod first end to pivotably attach the connecting rod to the piston; and plastically deforming the deformable sections of the wrist pin sufficiently to engage the bores in the piston thereby limiting the axial movement of the wrist pin relative to the piston.

15. The method of claim 14 wherein said wrist pin is formed of a tubular body.

16. The method of claim 15 wherein said step of deforming the wrist pin deformable ends further comprises outwardly bell-mouthing the ends of the wrist pin by pressing the wrist pin between a pair of conically tapered tool members.

17. The method of claim 14 wherein said step of deforming the wrist pin deformable ends further comprises simultaneously deforming the two deformable wrist pin ends using a pair of tool members which are coaxially aligned with the wrist pin and are pressed relative to one another.

* * * * *